UNITED STATES PATENT OFFICE.

WILLIAM I. LEWIS, OF WESTBROOK, CONNECTICUT.

MEDICAL COMPOUND.

SPECIFICATION forming part of Letters Patent No. 226,084, dated March 30, 1880.

Application filed January 29, 1880.

*To all whom it may concern:*

Be it known that I, WILLIAM I. LEWIS, of Westbrook, in the county of Middlesex and State of Connecticut, have invented a new and useful Improvement in Medical Compounds; and I do hereby declare that the following is a full, clear, and exact description of the same.

My invention relates to a medicinal compound; and it consists, essentially, of a composition or mixture of a distillate of the common witch-hazel (*Hamamelis Virginica*) and glycerine. The medicinal virtues and uses of the witch-hazel are well known.

Heretofore it has been customary to mix with the distilled product of the witch-hazel a certain proportion of alcohol. The object and effect of the alcohol admixture was simply to preserve the vegetable extract from fermentation, which would otherwise inevitably take place; but the alcohol itself added nothing to the medicinal qualities of the extract. On the contrary, for some purposes—as, for example, for application to the sensitive internal surface of the nostrils, and the like—the harshness of the alcohol has rendered it positively objectionable. Furthermore, the cost of the alcohol has added greatly to the expense of the material as prepared for the market.

I have discovered by careful experiment that a small quantity of glycerine may be added to the distilled witch-hazel with perfectly good results in respect to the preservation of the extract and with increased beneficial results in respect to the medicinal qualities of the compound.

The extract of the witch-hazel has been found to be of great benefit applied externally and internally. It has been applied with good effect both to the internal and external surface of the body where such surface had become by any cause diseased or injured. Its application to interior surfaces is most common in catarrhal affections and the like, and externally it is applied in case of sores or eruptions upon the skin.

With the glycerine admixture I have found the compound of increased benefit for the purpose last specified, the glycerine serving to soften the surface, and, by its penetrative properties, to facilitate the action of the vegetable agent and to render it more effectual. The glycerine also gives body to the extract and appears to prevent loss of the essential virtues of it by preventing or retarding evaporation. The glycerine itself is not in the slightest degree injurious when the compound is used internally; but from my observation and experience I believe it to be rather of increased benefit in this respect.

In carrying out my invention I take the extract as ordinarily made. This is best obtained by taking stems and branches of the witch-hazel shrub, preferably not more than an inch in diameter, and cutting them into very small pieces. These pieces are placed in a closed boiler sustained by a grating above the surface of the water. About thirty gallons of water are required to twenty bushels of witch-hazel. Heat is then applied and the vapors are distilled over and condensed in the ordinary manner. The process is continued as long as a pure and colorless product can be obtained, usually until about twenty gallons of the extract are condensed and collected. To every gallon of this extract I add eight ounces of pure glycerine, and the compound is then ready for bottling or use. The proportion of the glycerine may be somewhat varied; but the amount stated I have found to be best under ordinary circumstances.

The mixture, as prepared by me, is useful for all the purposes for which the ordinary extract is used, and, as before stated, for application to the scalp or for any external application its beneficial results are greatly increased.

I am aware that the use of glycerine as a preservative is not new; that it has been recommended heretofore as suitable for keeping pills and the like soft and free from molding, and for preserving extracts, these uses being set forth in the fourteenth edition of the United States Dispensatory. I therefore limit my claim to the specific ingredients in substantially the proportions above stated.

What I do claim as my invention, and desire to secure by Letters Patent, is—

A compound consisting of the extract of witch-hazel and glycerine, substantially in the proportions and for the purpose specified.

In testimony whereof I have signed my name to this specification in the presence of two subscribing witnesses.

WILLIAM I. LEWIS.

Witnesses:
L. W. SEELY,
F. L. MIDDLETON.